(12) United States Patent
Deh-Lee

(10) Patent No.: US 6,934,624 B2
(45) Date of Patent: Aug. 23, 2005

(54) SYSTEMS AND METHODS FOR PROVIDING INFORMATION REGARDING THE ARRIVAL OF A PARTY

(75) Inventor: Kenneth Deh-Lee, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 10/615,629

(22) Filed: Jul. 9, 2003

(65) Prior Publication Data

US 2005/0010357 A1 Jan. 13, 2005

(51) Int. Cl.[7] .............................................. G01C 21/26
(52) U.S. Cl. ..................... 701/200; 701/204; 701/211; 340/994; 455/456.2
(58) Field of Search .................... 701/29, 200, 201, 701/202, 204, 211; 340/988, 994; 455/456.1, 456.2, 456.3, 457, 459, 414.2

(56) References Cited

U.S. PATENT DOCUMENTS

| | | | | |
|---|---|---|---|---|
| 5,648,770 A | * | 7/1997 | Ross | 340/994 |
| 5,987,377 A | * | 11/1999 | Westerlage et al. | 701/204 |
| 6,492,912 B1 | * | 12/2002 | Jones | 340/994 |
| 6,700,506 B1 | * | 3/2004 | Winkler et al. | 340/994 |
| 2002/0016171 A1 | * | 2/2002 | Doganata et al. | 455/456 |
| 2003/0137435 A1 | * | 7/2003 | Haddad et al. | 340/994 |
| 2003/0195699 A1 | * | 10/2003 | Jones | 701/201 |
| 2004/0203932 A1 | * | 10/2004 | Yamagishi et al. | 455/457 |

* cited by examiner

*Primary Examiner*—Tan Q. Nguyen

(57) ABSTRACT

Representative embodiments are directed to systems and methods for notifying a first party of an impending arrival of a second party. One of the systems comprises: a first data structure that identifies a plurality of sites that the second party is scheduled to visit that includes a predetermined location; a second data structure that defines when the first party is to receive notification of impending arrival of the second party; an interface process for receiving navigational data that is indicative of a location of the second party; a monitoring process that utilizes the navigational data and the first data structure to estimate arrival times associated with the plurality of sites; and a notification process that is operable in response to the monitoring process to generate a notification message for the first party to communicate the impending arrival of the first party according to the second data structure.

20 Claims, 2 Drawing Sheets

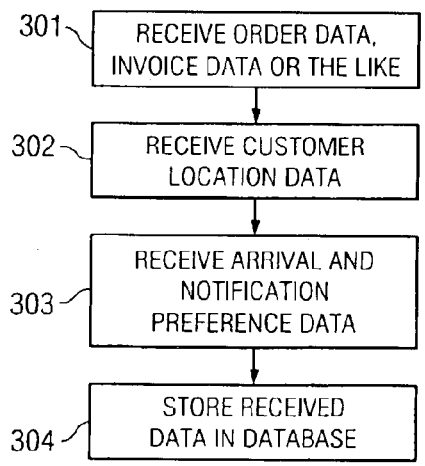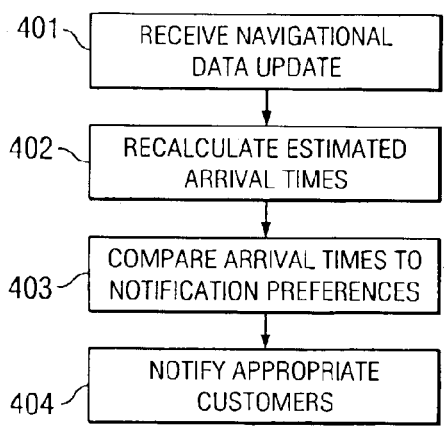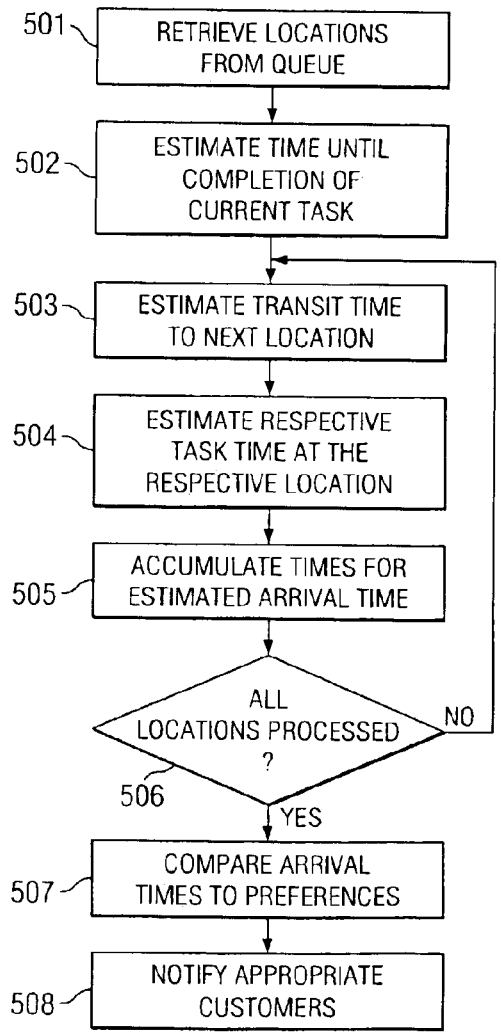

SYSTEMS AND METHODS FOR PROVIDING INFORMATION REGARDING THE ARRIVAL OF A PARTY

FIELD OF THE INVENTION

The invention relates generally to arrival notification, and more particularly to systems and methods for providing information regarding the arrival of at least one party.

DESCRIPTION OF THE RELATED ART

In today's business environment, a first party will frequently plan to meet a second party at an identified location. Frequently, businesses send their employees or subcontractor's employees to a site of one of its customers to deliver a product and/or provide a service. For example, a furniture retailer may maintain business relationships with a number of delivery firms to deliver the purchases of consumers. Typically, the consumers may identify a particular day for the delivery of their purchased products. However, due to the difficulty in scheduling the large number of purchases among a number of delivery firms, the exact time of the deliveries are not specified. Thus, consumers are typically required to simply wait at the delivery sites (e.g., their respective residences) until the products are delivered.

Several automated systems have been developed to address this problem. For example, known scheduling systems generate a list of customer to whom deliveries will be made. Also, a predetermined rate of deliveries is assumed (e.g., 1.5 deliveries per hour per delivery agent). Based upon the number of customers, the predetermined rate, and the number of delivery agents, the automated systems calculate a respective window of time for each delivery. The automated system may generate a telephone call to customers to inform the customers of the window of time expected for the deliveries. Although these systems are an improvement over completely indefinite times, these scheduling systems are not particularly accurate. Specifically, these systems do not account for discrepancies between the expected rate of deliveries and actual rates. For example, if a particular delivery truck is delayed at a specific location, these scheduling systems do not provide a mechanism to account for this situation. Accordingly, these systems typically provide a relatively large window of time during the identified day for the delivery.

BRIEF SUMMARY OF THE INVENTION

Representative embodiments are directed to systems and methods for notifying a first party of an impending arrival of a second party. One of the systems comprises: a first data structure that identifies a plurality of sites that the second party is scheduled to visit that includes a predetermined location; a second data structure that defines when the first party is to receive notification of impending arrival of the second party; an interface process for receiving navigational data that is indicative of a location of the second party; a monitoring process that utilizes the navigational data and the first data structure to/estimate arrival times associated with the plurality of sites; and a notification process that is operable in response to the monitoring process to generate a notification message for the first party to communicate the impending arrival of the first party according to the second data structure.

One of the methods comprises: storing first data that identifies a plurality of sites that the second party is scheduled to visit that includes a predetermined location; storing second data that defines when the first party is to receive notification of impending arrival of the second party; receiving navigational data that is indicative of a location of the second party; estimating arrival times associated with the plurality of sites utilizing the navigational data and the first data; and sending a message in response to the estimating to notify the first party to communicate the impending arrival of the first party according to the second data.

BRIEF DESCRIPTION OF THE DRAWINGS

FIGS. 3–5 depict flowcharts to facilitate notification of an impending arrival of a party according to representative embodiments.

DETAILED DESCRIPTION

Figure 1:
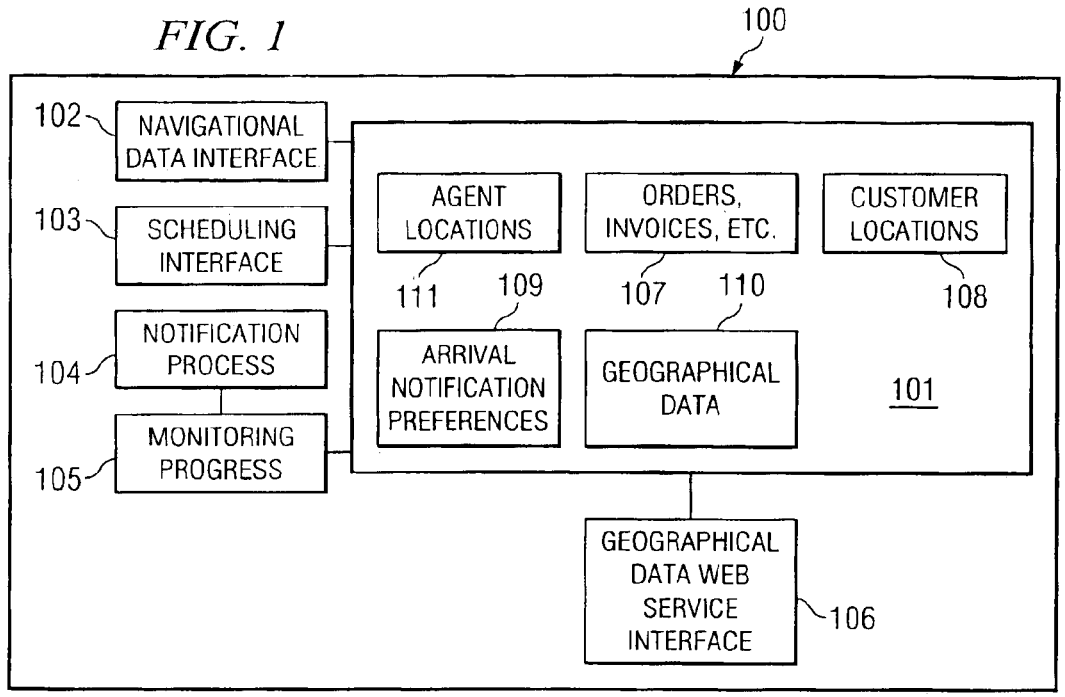
FIG. 1 depicts a system for estimating arrival times and notifying customers of the impending arrival of agents according to representative embodiments.

FIG. 1 depicts system 100 for notifying a first party of the impending arrival of a second party according to representative embodiments. In representative embodiments, system 100 may be utilized to estimate when a company's employees or agents will arrive at customer locations to perform specified tasks and/or to deliver various products. Although system 100 is suitable for managing a commercial enterprise, system 100 is not limited to any particular business application.

System 100 may be implemented utilizing a suitable computing platform such as a server platform that includes appropriate network connectivity. For example, system 100 may possess a network connection to a wireless network to communicate wireless packet data. System 100 may also be connected to the Internet, the Public Switched Telephone Network (PSTN), and/or any other suitable network.

System 100 comprises database 101 to store data structures that enable system 100 to estimate when one or more agents will arrive at customer locations. Database 101 includes agent location data 111 that is indicative of the current locations of agents. Agent location data 111 may be updated from time to time. Specifically, system 100 may include navigational data interface 102 that receives navigational data pertaining to the respective agents. Representative embodiments may utilize several types of data to update agent location data 111. For example, global positioning system (GPS) data may be utilized if the agents and/or their vehicles possess GPS receivers. The GPS data may be used to pinpoint the location of the agents and/or their average speed during travel from one location to another. The navigational data may include street addresses or other location data that is manually identified by the agents. For example, when an agent arrives at a particular location, the agent may utilize a suitable interface on a personal digital assistant (PDA) to indicate that the agent has arrived at a customer location. Alternatively, the agent may utilize a cellular telephone or other suitable wireless device to communicate that the agent has arrived at a customer location. The locating facilities associated with the cellular or wireless network accessed by the device may be utilized to communicate the agent's current location. Alternatively, the agent may communicate the location by interacting with an interactive voice response (IVR) unit.

Database 101 may include customer location data 108. Customer location data 108 may be entered when a customer order or invoice is created, for example. Database 101 may further include task data 107. Task data 107 may indicate the purpose of the arrival of an agent at a respective customer location. Task data 107 may be encoded within customer order data, invoices, and/or the like. Task data 107 may be utilized to estimate the amount of time that an agent will spend at a particular location. For example, for one customer location, an agent may merely deliver a particular product. For the next location, the agent may be required to install another product thereby requiring an additional amount of time to be spent at that location. In addition, certain dependencies may affect arrival times as will be discussed below.

Database 101 may include arrival and notification preferences data 109 to specify when and under what circumstances customers wish to have agents arrive at their locations. Preferences data 109 may be utilized to assign customers to a particular position in a queue based upon when customers wish to have the agent arrive at the defined location. Preferences data 109 may further specify when customers wish to receive notification of the impending arrival of an agent. For example, customers may require at least one hour notice to return to their locations to meet the agent upon arrival. Scheduling interface 103 may enable customers to provide such data. Scheduling interface 103 may be implemented as a website and/or an IVR unit. Scheduling interface 103 may provide other functionality. For example, scheduling interface 103 may communicate to a customer the customer's position in a queue, the distance between an agent and the customer's premises, and/or any other suitable information. Furthermore, scheduling interface 103 may enable a customer to reschedule an arrival of an agent. Dependency information may be received via scheduling interface 103. For example, a particular work order or service request may require associated personnel (in addition to the personnel performing the work order or service) to deliver necessary parts to the location. The associated personnel may communicate their expected arrival time via scheduling interface 103. Then, the arrival time of the personnel performing the work order or service may be estimated using that information.

Database 101 may further include geographical data 110. For example, geographical data 110 may be implemented to define street locations within a given city. The geographical data may be utilized to estimate distances between locations and to estimate the routes that agents will take to a location. In addition to or in lieu of geographical data 110, system 100 may include geographical data web-service interface 106 that may query a remote web-service to obtain suitable geographical information.

System 100 may further include monitoring process 105. When navigational data for an agent is received, monitoring process 105 may utilize the navigational data to estimate when the agent will arrive at various scheduled locations. In response to monitoring process 105, notification process 104 may utilize the estimated times and preferences data 109 to generate notification messages. The notification messages may be used to communicate that an agent will arrive at customer locations within a particular time frame. The notification may occur by generating a telephone call to a customer. The notification may occur by utilizing an e-mail notification, a wireless text message, a page, and/or the like.

Figure 2:
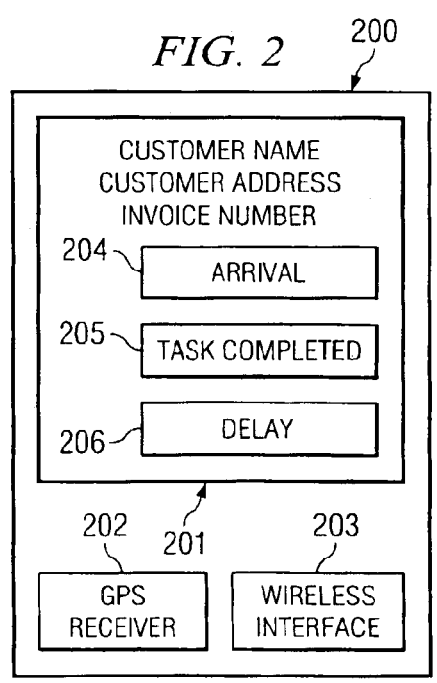
FIG. 2 depicts a personal digital assistant for communicating navigational data according to representative embodiments.

FIG. 2 depicts PDA 200 adapted according to representative embodiments for facilitating notification of the impending arrival of a party. PDA 200 may comprise wireless interface 203. Wireless interface 203 may communicate navigational data to system 100 utilizing any number of suitable communication networks and protocols. For example, wireless interface may implement the general packet radio service (GPRS) to communicate the navigational data. The navigational data may be obtained autonomously utilizing GPS receiver 202. Additionally or alternatively, the navigational data may be obtained manually. For example, PDA 200 may include graphical user interface (GUI) 201. GUI 201 may identify customer locations. When an agent arrives at a location, the agent may select GUI object 204 to communicate that the agent has arrived. When the agent completes the defined tasks (e.g., delivered a product into the customer's premises), the agent may select GUI object 205 to indicate the completion of the task. If the agent will not proceed directly to the next location, the agent may select GUI object 206 to indicate a delay in the agent's activities.

Although representative embodiments have been described as utilizing PDA 200 to communicate navigational data, embodiments are not so limited. For example, suitable navigational data gathering and communicating functionality may be embedded in any suitable system (e.g., an agent vehicle) according to representative embodiments. Furthermore, the estimated arrival times may also be communicated to any other suitable party as desired.

FIG. 3 depicts a flowchart to facilitate notification of an impending arrival of a party. In step 301, order data, invoice data, and/or the like may be received. In step 302, customer location data (e.g., an address) may be received. In step 303, arrival and notification preference data may be received. In step 304, the received data may be stored in database 101.

FIG. 4 depicts another flowchart to facilitate notification of an impending arrival of a party. In step 401, an update may be received to provide navigational data for an agent. In step 402, the arrival times associated with that agent may be recalculated. In step 403, the estimated arrival times may be compared to notification preferences. In step 404, appropriate customers may be notified of the impending arrival of the agent.

FIG. 5 depicts another flowchart to facilitate notification of an impending arrival of a party. In step 501, a plurality of locations that an agent is scheduled to visit may be retrieved from a queue. In step 502, the time until completion of the agent's current task is completed. In step 503, the transit time to the next location is estimated. In step 504, the respective time expected for the agent's task at the respective location is estimated. In step 505, the estimated times are accumulated to generate an estimated arrival time. In step 506, a logical comparison is made to determine whether there are further locations to be processed. If there are further locations, the process flow returns to step 503. If not, the process flow proceeds to step 507. In step 507, the estimated arrival times are compared to customer preferences. In step 508, appropriate customers are notified.

Representative embodiments may provide numerous advantageous. Specifically, representative embodiments enable more accurate estimates of arrival times to be provided to customers. By providing more accurate estimates of arrival times, customer satisfaction associated with the delivery of goods and/or services may be increased. Furthermore, representative embodiments enable customers to define how the notification should occur. Customers may define a minimum amount of time for the notification of the impending arrival of an agent to ensure that the customer is at the arrival location. Thus, customers are not required to spend an inordinate amount of time at the arrival location to ensure that the customer is present when the agent arrives. The customer may utilize the minimum notification period to return to the arrival location.

What is claimed is:

1. A system for notifying a first party of an impending arrival of a second party at a predetermined location, comprising:

a first data structure that identifies a plurality of sites that said second party and a third party are scheduled to visit, wherein said second party is scheduled to visit said predetermined location;

a second data structure that defines when said first party is to receive notification of impending arrival of said second party;

a third data structure that identifies respective tasks to be performed by said second party at said plurality of sites;

a fourth data structure that identifies dependencies associated with tasks identified in said third data structure that require said third party to arrive at a common location with said second party;

an interface process for receiving navigational data that is indicative of locations of said second party and said third party;

a monitoring process that utilizes said navigational data and said first, third, and fourth data structures to estimate arrival times associated with said plurality of sites; and a notification process that is operable in response to said monitoring process to generate a notification message for said first party to communicate said impending arrival of said first party according to said second data structure.

2. The system of claim 1 wherein said notification message includes an estimated arrival time.

3. The system of claim 1 wherein said monitoring process determines a distance between a previous one of said plurality of sites and said predetermined location to calculate said estimated arrival times.

4. The system of claim 1 wherein said monitoring process calculates an average speed of said second party to calculate said estimated arrival times.

5. The system of claim 1 wherein said interface process receives delay information that indicates said second party will not directly proceed from one of said plurality of sites to a subsequent one of said plurality of sites.

6. The system of claim 1 wherein said notification process is operable to respond to a query from said second party to identify a distance between said second party and said predetermined location.

7. The system of claim 1 wherein said second data structure identifies a minimum amount of time before said impending arrival.

8. The system of claim 1 wherein said notification process generates an automated telephone call to a telephone number associated with said first party to communicate said impending arrival of said first party.

9. The system of claim 1 further comprising:

a second interface process that is operable to receive a message from said first party requesting said impending arrival be rescheduled.

10. The system of claim 1 wherein said navigational data comprises data that indicates that said second party has arrived at one of said a plurality of sites.

11. The system of claim 1 wherein said navigational data includes global positioning data.

12. A method for notifying a first party of an impending arrival of a second party at a predetermined location, comprising:

storing first data that identifies a plurality of sites that said second party and a third party are scheduled to visit, wherein said second party is scheduled to visit said predetermined location;

storing second data that defines when said first party is to receive notification of impending arrival of said second party;

storing third data that identifies respective tasks to be performed by said second party at said plurality of sites;

storing fourth data that identifies dependencies associated with tasks identified in said third data that require said third party to arrive at a common location with said second party;

receiving navigational data that is indicative of locations of said second party and said third party;

estimating arrival times associated with said plurality of sites utilizing said navigational data and said first, third, and fourth data; and sending a message in response to said estimating to notify said first party to communicate said impending arrival of said first party according to said second data.

13. The method of claim 12 wherein said message includes an estimated arrival time.

14. The method of claim 12 wherein said estimating determines a distance between a previous one of said plurality of sites and said predetermined location to calculate said estimated arrival times.

15. The method of claim 12 wherein said estimating calculates an average speed of said second party to calculate said estimated arrival times.

16. The method of claim 12 further comprising:

receiving delay information that indicates said second party will not directly proceed from one of said plurality of sites to a subsequent one of said plurality of sites.

17. The method of claim 12 wherein said second data identifies a minimum amount of time before said impending arrival.

18. The method of claim 12 further comprising:

generating an automated telephone call to a telephone number associated with said first party to communicate said impending arrival of said first party.

19. A system for notifying a first party of an impending arrival of a second party at a predetermined location, comprising:

means for identifying a plurality of sites that said second party and a third party are scheduled to visit, wherein said second party is scheduled to visit said predetermined location;

means for defining notification criteria;

means for receiving data associated with locations of said second party and said third party;

means for determining amounts of time to be spent at said plurality of sites in reference to respective tasks to be performed by said second party;

means for identifying dependencies associated with tasks identified by said means for determining that require said third party to arrive at a common location with said second party;

means for estimating arrival times associated with said plurality of sites utilizing said data associated with said locations and said plurality of sites and in response to said means for determining and said means for identifying; and means for sending a message, in response to said means for estimating, to notify said first party to communicate said impending arrival of said first party according to said notification criteria.

20. The system of claim 19 further comprising:

means for automatically calling a telephone number associated with said first party to communicate said impending arrival of said first party.

* * * * *